United States Patent
Yao

[19]

[11] Patent Number: 6,014,010
[45] Date of Patent: Jan. 11, 2000

[54] CHARGER COMPATIBLE WITH DIFFERENT-SIZED RECHARGEABLE BATTERIES OF MOBILE TELEPHONES

[76] Inventor: Li-Ho Yao, 4th Fl., No. 99-4, Tungan St., Taipei, Taiwan

[21] Appl. No.: 09/064,679

[22] Filed: Apr. 22, 1998

[51] Int. Cl.⁷ .............................. H02J 7/00; H01R 13/62; H01M 12/00
[52] U.S. Cl. .............................. 320/110; 320/107; 429/9; 439/296; 439/347
[58] Field of Search .................................... 320/110, 107, 320/112; 439/296, 347; 429/9

[56] References Cited

U.S. PATENT DOCUMENTS

| | | | |
|---|---|---|---|
| 5,280,229 | 1/1994 | Faude et al. ............................ | 320/110 |
| 5,592,064 | 1/1997 | Morita ..................................... | 320/110 |
| 5,733,674 | 3/1998 | Law et al. ................................... | 429/9 |
| 5,762,512 | 6/1998 | Trant et al. .............................. | 439/347 |

Primary Examiner—Peter S. Wong
Assistant Examiner—Gregory J. Toatley, Jr.
Attorney, Agent, or Firm—Kolisch Hartwell Dickinson McCormack & Heuser

[57] ABSTRACT

A charger compatible with different-sized rechargeable batteries of mobile telephones includes a body for charging the battery and an adapter optionally utilized to electrically connect the rechargeable battery with the body. In a preferred embodiment, the body is detachably mounted to an under face of the adapter and electrically connected with the adapter. The battery is detachably mounted to a top face of the adapter and electrically connected with the adapter. The adapter may have different configurations adaptable for different-sized mobile telephone batteries. In an alternative preferred embodiment, the battery is directly mounted to a surface of the body and electrically connected with the body. With this arrangement, expense for purchasing a different charger can be eliminated when a user attempts to use a second mobile telephone having a size different from that of a first mobile telephone, because only the adapter needs to be replaced and the first body can be re-used.

6 Claims, 7 Drawing Sheets

6,014,010

CHARGER COMPATIBLE WITH DIFFERENT-SIZED RECHARGEABLE BATTERIES OF MOBILE TELEPHONES

BACKGROUND OF THE INVENTION

1. Field of the Invention

The present invention relates to a battery charger, and more particularly to a charger which is compatible with different-sized rechargeable batteries of mobile telephones by optionally utilizing an adapter.

2. Description of Related Art

With the development of telecommunication technique, mobile telephones have become more and more popular because of the advantages of portability and easy usage. As is well known, a power supply of a mobile telephone generally is provided by a rechargeable battery which is particularly configured to match the mobile telephone. Therefore, a variety of batteries can be found in the market, which are individually designed to provide electric power to a corresponding mobile telephone. However, it is also well known that when power stored in a certain rechargeable battery is exhausted, a specific charger needs to be utilized to recharge the rechargeable battery. If an original mobile telephone is lost or irreparably broken, the user must buy a new charger as well as the new telephone, thereby resulting in a wasted original charger.

The present invention provides an improved battery charger to mitigate and/or obviate the aforementioned problems.

SUMMARY OF THE INVENTION

The main object of the present invention is to provide a charger which is compatible with different-sized rechargeable batteries of mobile telephones by optionally utilizing an adapter.

Other objects, advantages and novel features of the invention will become more apparent from the following detailed description when taken in conjunction with the accompanying drawings.

DETAILED DESCRIPTION OF PREFERRED EMBODIMENT

Figure 1:
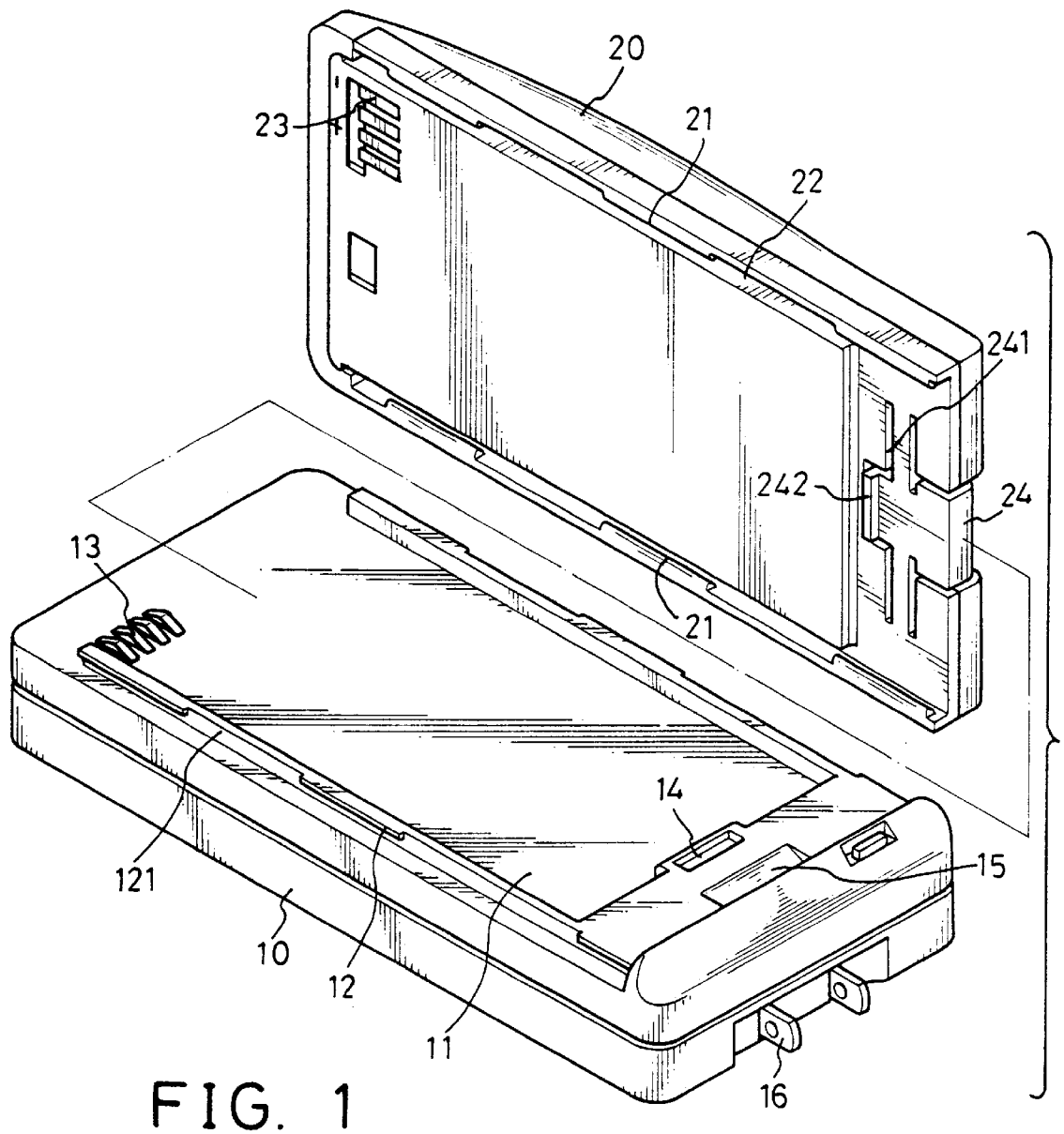
FIG. 1 is an exploded perspective view showing a battery charger constructed in accordance with a first preferred embodiment of the present invention.
Figure 2:
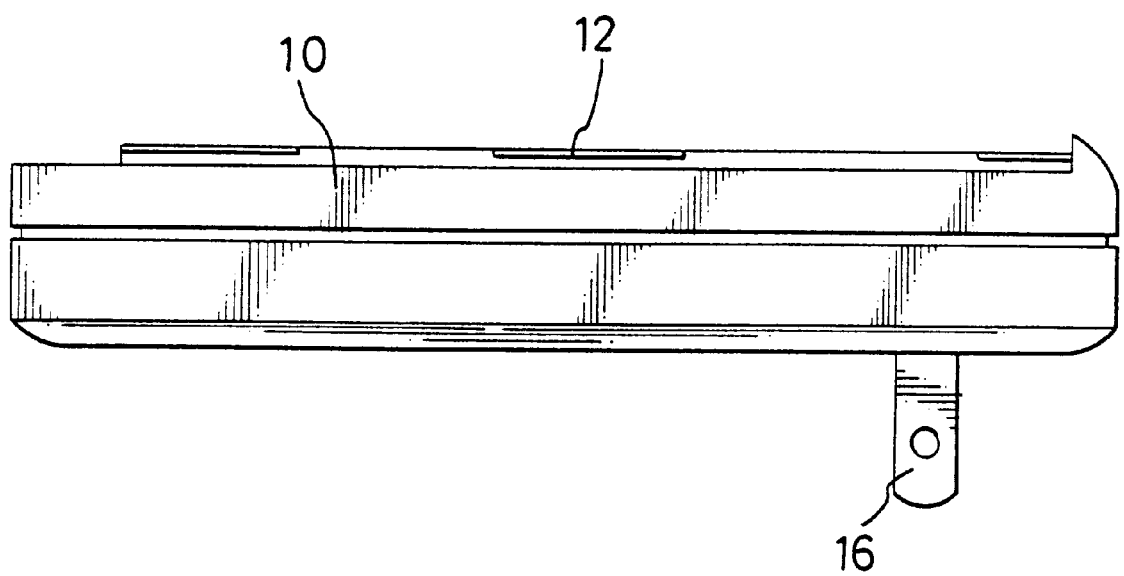
FIG. 2 is a side view showing a body of the battery charger of FIG. 1.

FIG. 1 shows an exploded perspective view of a battery charger constructed in accordance with a first preferred embodiment of the present invention. Referring to the figure, the battery charger substantially comprises a body 10 and an adapter 20. The body 10 has main electric components (not shown) formed therein, which are provided for charging a rechargeable battery 30 (see FIG. 3). The adapter 20 is detachably mounted to the body 10 for connecting the body 10 with the rechargeable battery 20 and enabling the body 10 to be compatible with different-sized rechargeable batteries. The detailed structure of the body 10 and the adapter 20 are described hereinafter.

Still referring to FIG. 1, the body 10 has, a plug 16 formed in a cutout defined in a first end thereof, which can be pivoted for electrical connection in a conventional manner. A top face of the body 10 defines a depression 11 therein. Each of the two opposed side walls defining the depression 11 has a plurality of spaced overhanging lips extending therefrom. Adjacent overhanging lips 12 define a gap 121 therebetween. The top face of the body 10 further has a plurality of conducting strips 13 formed thereon and defines a cavity 15 proximate the first end thereof and a substantially rectangular hole 14 near the cavity 15. The adapter 20 has a plate (not numbered) projecting from an under face thereof to be received in the depression 11 of the body 10. A plurality of first conductive contacts 23 are formed on the plate to electrically connect with the plurality of conducting strips 13 after the adapter 20 is mounted on the body 10. Each of the two opposed Wide walls of the adapter 20 has a plurality of spaced flanges 21 extending from a bottom thereof and corresponding to the spaced overhanging lips 12. Adjacent flanges 21 define a notch 22 therebetween. It is to be noted that each flange 21 is sized to be received in a respective one of the gaps 121. With this arrangement, by aligning the flanges 21 to the corresponding gaps 121 and then urging the flanges 21 to engage with the respective overhanging lips 12, the adapter 20 is secured to the body 10. The adapter 20 has a latch portion (not numbered) integrally formed at a first end thereof. A top face of a first end of the latch portion has a press section 24 and a bottom face of a second end of the latch portion has a hook 242 downwardly extending therefrom. A plurality of slots 241 are defined around the latch portion to provide a degree of resilience thereto. The hook is sized such that when the adapter 20 is fitted to the top face of the body 10, the hook 242 is securely received in the rectangular hole 14, thereby enhancing the securement of the adapter 20 to the body 10 via the spaced flanges 21 and the spaced overhanging lips 12. To detach the hook 242 from the adapter 20, the press section 24 of the latch portion is pushed downward partly into the cavity 15 whereby the second end of the latch portion accordingly moves away from the body 10 such that the hook 242 is disengaged from the rectangular hole 14. The resilience provided by the slots 241 permits the latch portion to resume its original state where pressure is removed from the press section.

Figure 3:
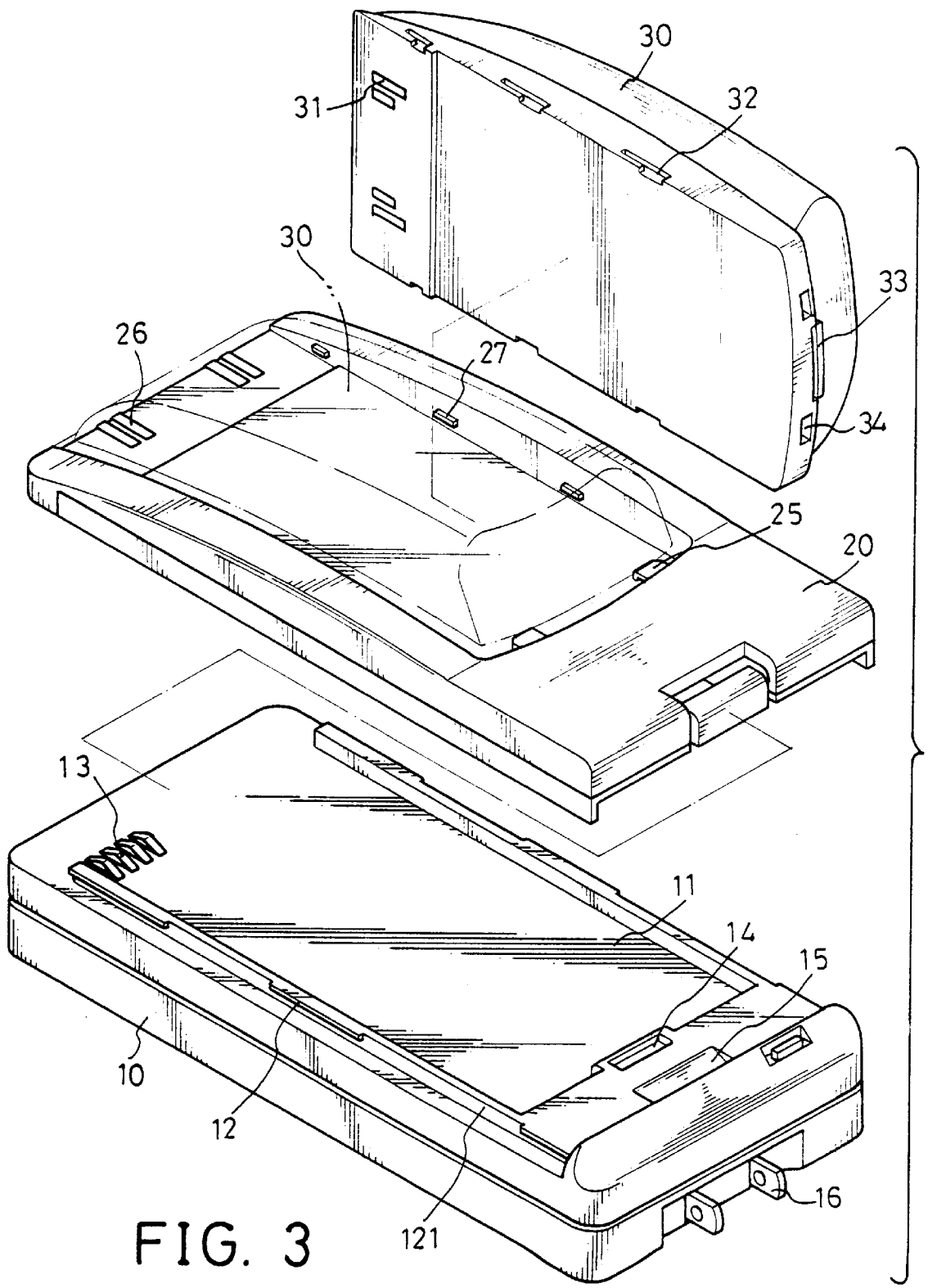
FIG. 3 is a further exploded perspective view showing a rechargeable battery and the battery charger of FIG. 1.
Figure 4:
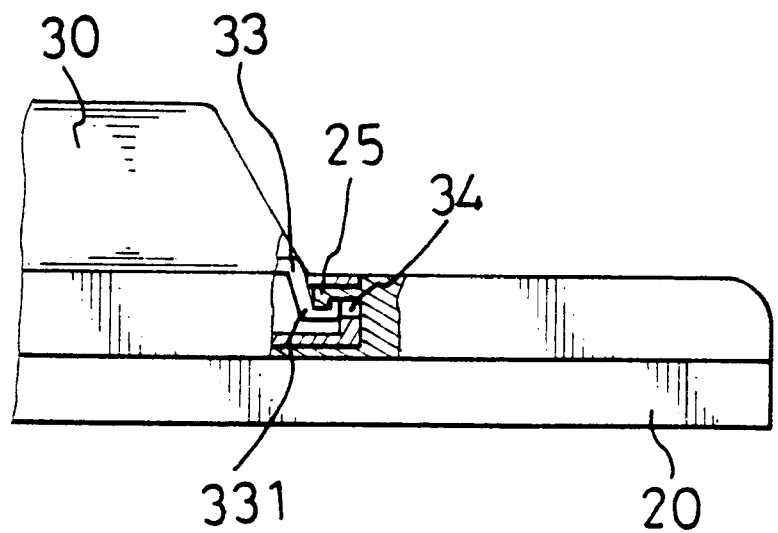
FIG. 4 is a partial sectional view showing engagement of the rechargeable battery and the battery charger of FIG. 1.

Referring to FIG. 3, in accordance with the first embodiment of the present invention, a top side face of the adapter 20 defines a recess (not numbered) therein. The recess is sized to receive the rechargeable battery 30 with a specific configuration. A bottom face of the recess has a plurality of second conductive contacts 26 formed thereon and in connection with the first conductive contacts 23 on the under face of the adapter 20. Each of the two opposed side walls defining the recess has a plurality of spaced protrusions 27 extending therefrom. An end wall defining the recess and close to the latch portion of the adapter 20 has a pair of extensions 25 formed thereon. The rechargeable battery 30 typically has a plurality of connection points 31 formed on an under face thereof to electrically connect with the second conductive contacts 26 of the adapter 20, thereby electrically connecting the rechargeable battery 30 with the body 10. Two opposed side walls of the battery 30 respectively have a plurality of spaced L-shaped slots 32 defined in a bottom edge thereof for receiving the respective spaced protrusions 27 of the adapter 20. Each of the L-shaped slots 32 defines an opening (not numbered) and a slit (not numbered) perpendicular to and in communication with the opening. The battery 30 further has a press portion 33 formed at a first end corresponding to the pair of extensions 25 of the adapter 20. A pair of through holes 34 are defined in the battery 30 each being at one side of the press portion 33. Referring to FIG. 4, the press portion 33 is received in a slot (not numbered) defined in a top face of the first end of the battery 30 and has two hook portions 331 respectively formed at two distal ends thereof. The pair of through holes 34 are defined in a side face of the slot and near the press portion 33. Each of the through holes 34 is aligned with one of the hook portions 331 of the press portion 33 and is provided with a respective extension 25 of the adapter 20 to extend therethrough. After the rechargeable battery 30 is received in the recess of the adapter 20, the protrusions 27 extend through the corresponding openings of the L-shaped slots 32 of the battery 30. By urging the battery 30 towards the first end of the adapter 20, the extensions 25 extend through the respective through holes 34 and engage with the hook portions 331 of the press portion 33, whereby the battery 30 is secured in the recess of the adapter 20. Meanwhile, the protrusions 27 will be securely received in the slits of the respective L-shaped slots 32 to attain a further securement of the battery 30 to the adapter 20. To detach the battery 30 from the adapter 20, the press portion 33 is pushed downward to disengage and the hook portions 331 are moved away from the extensions 25, then the protrusions 27 can be retracted from the openings of the L-shaped slots 32.

Figure 7:
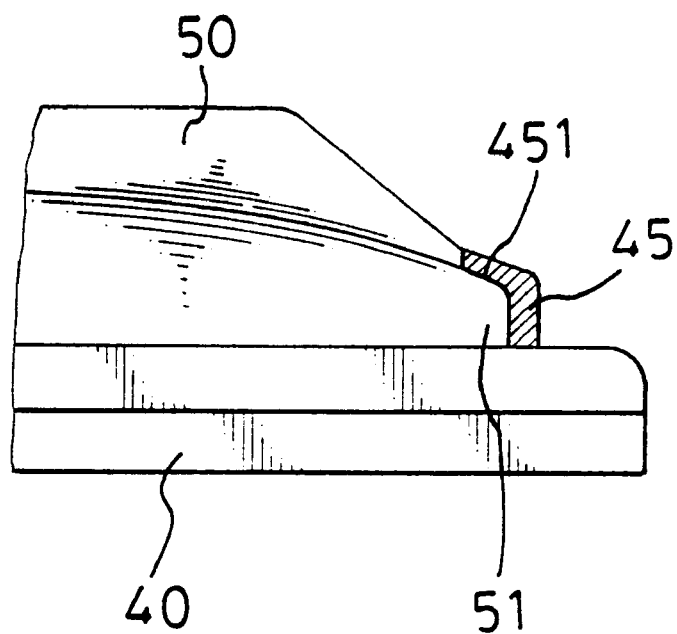
FIG. 7 is a partial sectional view showing engagement of the rechargeable battery and the battery charger of FIG. 6.
Figure 5:
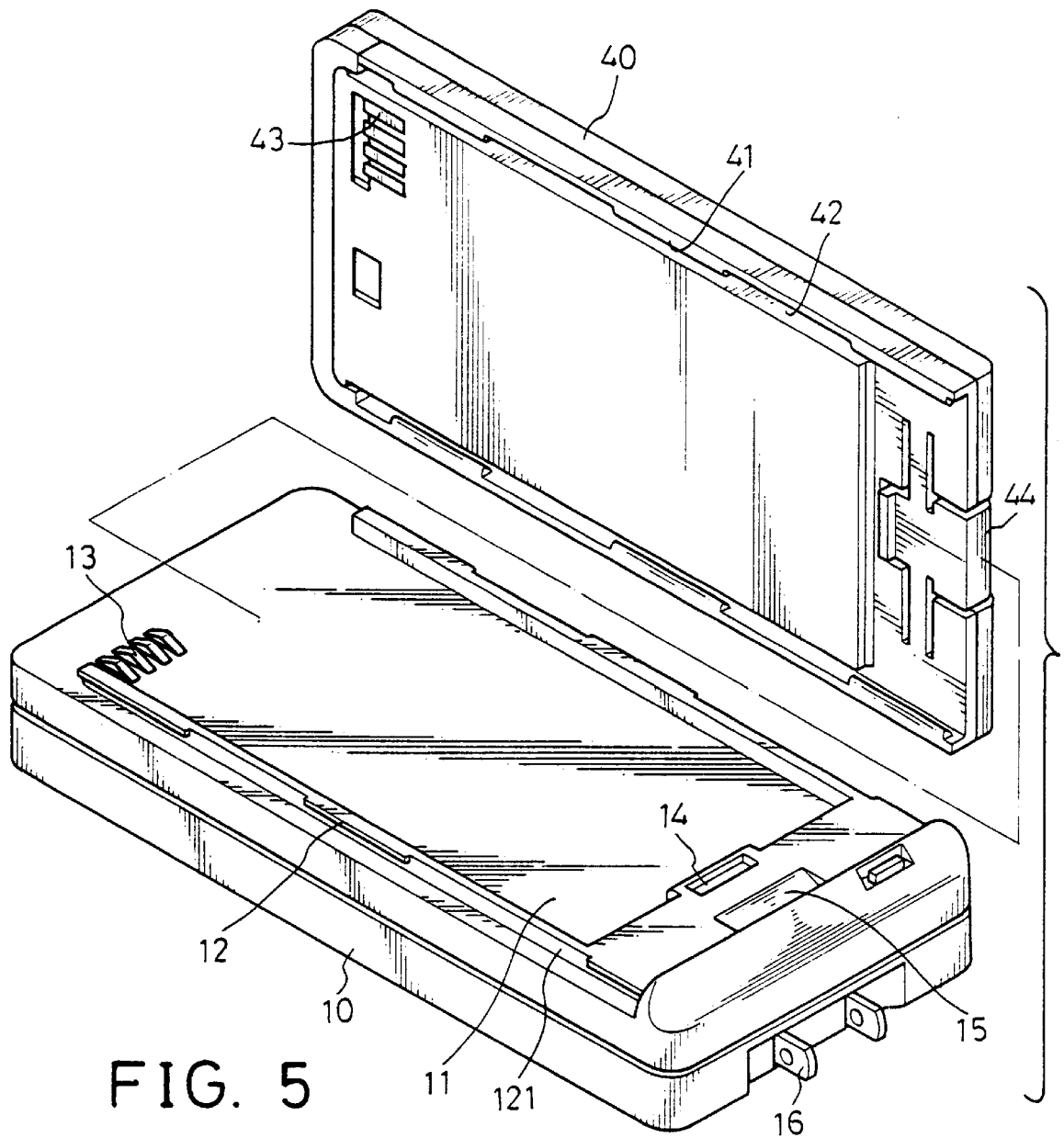
FIG. 5 is an exploded perspective view showing a battery charger constructed in accordance with a second preferred embodiment of the present invention.
Figure 6:
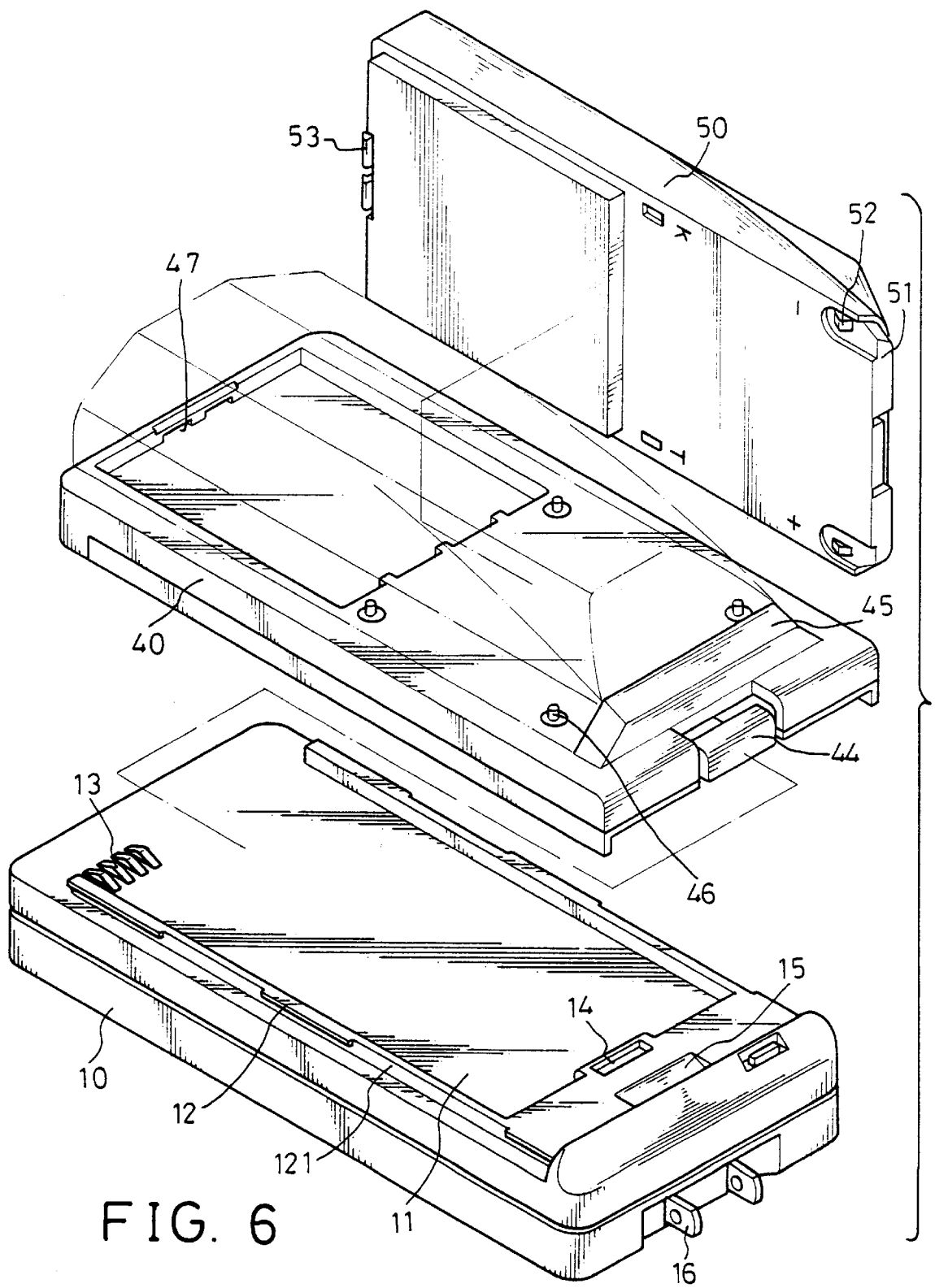
FIG. 6 is a further exploded perspective view showing the battery charger of FIG. 5 and a rechargeable battery different from that of FIG. 3.

FIG. 5 and FIG. 6 show a battery charger in accordance with a second preferred embodiment of the present invention. The charger has the same structure as that of the first preferred embodiment. The difference from the first preferred embodiment is that an adapter 40 of the charger is configured to mate with a rechargeable battery 50. Similar to the first embodiment, the adapter 40 also has a plurality of first conductive contacts 43 formed on an under face thereof to electrically connect with the plurality of conducting strips 13 after the adapter 40 is mounted to the body 10. Two opposed side walls of the adapter 40 have a plurality of spaced flanges 41 extending oppositely from a bottom thereof and corresponding to the spaced overhanging lips 12. Adjacent flanges 41 define a notch 42 therebetween. By aligning the flanges 41 with the gaps 121 and then urging the flanges 41 to engage with the respective overhanging lips 12, the adapter 40 can be detachably mounted to the body 10. Also, the adapter 40 has a press button 44 formed at a first end thereof, provided for further securing the adapter 40 on the body 10. Referring to FIG. 6, a top face of the adapter 40 has a projecting block 45 formed thereon proximate a first end of the adapter 40. FIG. 7 shows that the projecting block 45 has an excavation 451 defined therein at a side opposite the first end of the adapter 40 to receive a first end 51 of the rechargeable battery 50. Referring to FIG. 6, a recess (not numbered) is defined in the surface of the adapter 40 and proximate a second end of the adapter 40 to receive a plate (not numbered) extending from an under face of the rechargeable battery 50. A distal-end wall defining the recess defines a plurality of holes 47 therein to correspondingly engage with a plurality of hooks 53 formed on the plate of the battery 50. The top face of the adapter 40 further has a plurality of conductive posts 46 formed thereon to be electrically connected with a corresponding plurality of connection points 52 formed on the under face of the battery 50. In this way, the rechargeable battery 50 can be secured on the adapter 40 and charged by the body 10 via the adapter 40.

Figure 8:
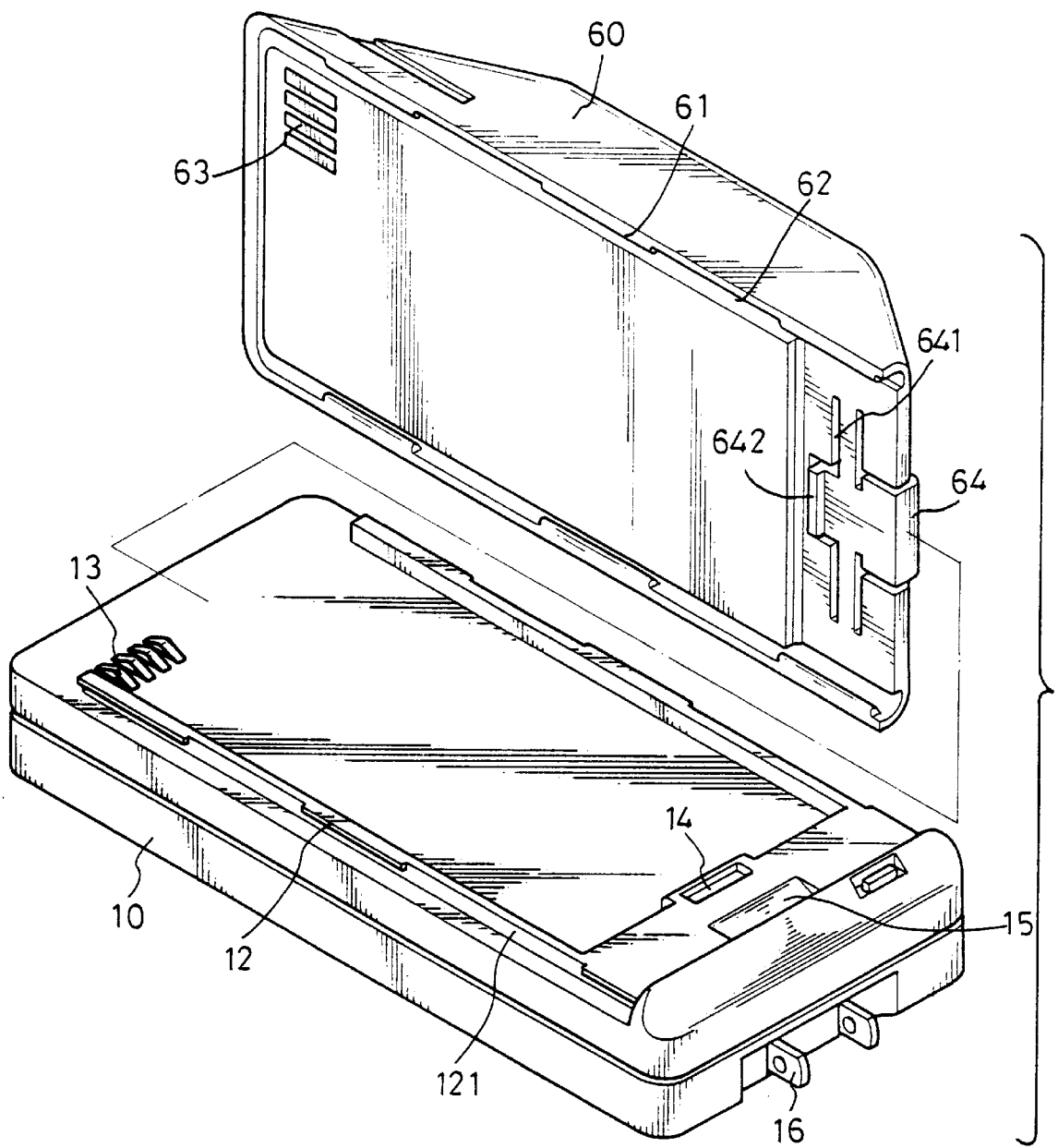
FIG. 8 is a perspective view showing a battery charger constructed in accordance with a third embodiment of the present invention.

Referring to FIG. 8, in a third preferred embodiment of the present invention, a rechargeable battery pack 60 is directly and detachably mounted to the body 10 for charging. The rechargeable battery pack 60 with specific configuration generally has a plurality of conductive contacts 63 formed on an under face thereof to electrically connect with the plurality of conducting strips 13 of the body 10 after it is mounted to the body 10. Two opposed side walls of the battery 60 each has a plurality of spaced flanges 61 extending oppositely from a bottom thereof and corresponding to the spaced overhanging lips 12 of the body 10. Adjacent flanges 61 define a notch 62 therebetween. Similar to the first and second embodiment mentioned above, the battery 60 can be detachably mounted to the body 10 by aligning the flanges 61 with the gaps 121 and then urging the flanges 61 to engage with the respective overhanging lips 12. The rechargeable battery pack 60 further has a latch portion (not numbered) integrally formed at a first end thereof. A top face of a first end of the latch portion has a press button 64 and a bottom face of a second end of the latch portion has a hook 642 downwardly extending therefrom. A plurality of slots 641 are defined around the latch portion to provide a degree of resilience thereto. The hook 642 is sized to be securely received in the rectangular hole 14, thereby enhancing the securement to the body 10 via the spaced flanges 21 and the spaced overhanging lips 62. To detach the hook 642 from the body 10, the press button 64 is pushed downward partly into the cavity whereby the second end of the latch portion accordingly will move away from the body such that the hook 642 is disengaged from the rectangular hole 14. The resilience provided by the slots 641 permits the latch portion to resume its original state when pressure is removed from the press button 64.

From the above description, it is to be appreciated that the charger in accordance with the present invention is compatible with different-sized rechargeable batteries of mobile telephones by optionally utilizing an adapter. It is also to be appreciated that when a user attempts to use a second mobile telephone with batteries of a different size to a first mobile telephone, he/she may replace only a second adapter mating with the second mobile telephone, without replacing the whole charger, so as to re-use the body of his/her first mobile telephone charger. In this way, the expense for purchasing a new charger can be eliminated because the adapter has a simple structure and thus has a relatively low cost.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A charger compatible with different-sized rechargeable batteries of mobile telephones, comprising:
   a body for charging a rechargeable battery; and
   an adapter detachably mounted between the body and the rechargeable battery and electrically connecting the body with the rechargeable battery;

wherein said adapter includes:

a recess defined in a top face thereof, each of two opposed side walls defining the recess having a plurality of protrusions respectively extending therefrom to be receivably engaged with a plurality of corresponding slots defined in a bottom edge of each of two side walls of the rechargeable battery; and a pair of extensions formed on a side wall of the recess proximate a first end of the adapter to be engaged with a pair of hook portions formed on two distal ends of a press portion formed on the rechargeable battery.

2. A charger compatible with different-sized rechargeable batteries of mobile telephones as claimed in claim 1, wherein said body has a plurality of spaced overhanging lips respectively extending from two sides of a top face thereof, adjacent overhanging lips defining a gap therebetween, said adapter has a plurality of spaced hooks respectively extending from two sides of an under face thereof to receivably engage with the respectively overhanging lips by aligning the hooks with the respective gaps of the body and then urging the hooks to receive the respective overhanging lips.

3. A charger compatible with different-sized rechargeable batteries of mobile telephones as claimed in claim 1, wherein said body has a cavity defined in a first end thereof and a hole defined near the cavity, said adapter has a latch portion integrally formed in a first end thereof, a top face of a first end of the latch portion having a press section corresponding to the cavity, a bottom face of a second end of the latch portion having a hook downwardly extending therefrom to be correspondingly received in the hole of the body.

4. A charger compatible with different-sized rechargeable batteries of mobile telephones as claimed in claim 1, wherein said adapter has a plurality of first connecting points formed on an under face thereof to electrically connect with a corresponding plurality of connecting points formed on the body, and a plurality of second connecting points formed on the surface thereof to electrically connect with a corresponding plurality of connecting points formed on the rechargeable battery.

5. A charger compatible with different-sized rechargeable batteries of mobile telephones as claimed in claim 1, wherein said adapter includes:

a projecting block formed on a top face thereof proximate a first end of the adapter, said projecting block defining an excavation at a side opposite to the first end of the adapter to receive a first end of the rechargeable battery; and a recess defined in the top face thereof and proximate a second end of the adapter to receive a plate extending from an under face of the rechargeable battery, an distal-end wall defining said recess having a number of holes defined therein to correspondingly and receivable engage with a number of hooks formed on the plate of the rechargeable battery.

6. A charger compatible with different-sized rechargeable batteries of mobile telephones as claimed in claim 5, wherein said top face of the adapter further has a plurality of conductive posts formed thereon to be electrically connected with the corresponding connection points formed on the under face of the rechargeable battery.

\* \* \* \* \*